United States Patent [19]

Combest

[11] 4,036,758

[45] July 19, 1977

[54] FLUID FILTER

[75] Inventor: John F. Combest, Findlay, Ohio

[73] Assignee: R. L. Kuss & Co., Inc., Findlay, Ohio

[21] Appl. No.: 721,804

[22] Filed: Sept. 8, 1976

[51] Int. Cl.² .................................... B01D 35/06
[52] U.S. Cl. .................................... 210/223; 10/342; 210/446; 210/451
[58] Field of Search ............... 210/222, 223, 315, 337, 210/338, 342, 435, 444, 451, 455, 458, 460, 446

[56] References Cited

U.S. PATENT DOCUMENTS

| 1,633,818 | 6/1927 | Kogstrom | 210/444 |
|---|---|---|---|
| 2,365,149 | 12/1944 | Anderson | 210/315 X |
| 3,211,292 | 10/1965 | Bull | 210/342 |
| 3,310,173 | 3/1967 | Sosower | 210/315 X |
| 3,347,386 | 10/1967 | Kraissl, Jr. | 210/342 X |
| 3,841,489 | 10/1974 | Combest et al. | 210/223 |
| 3,890,232 | 6/1975 | Combest et al. | 210/223 |

Primary Examiner—Theodore A. Granger
Attorney, Agent, or Firm—Vincent L. Barker, Jr.

[57] ABSTRACT

The invention is a compact in-line fluid filter. Two nested filter baskets have circumferential walls of fine mesh filtering media which is capture molded into a supporting structure. A magnet, transversely mounted to the fluid flow, attracts and retains ferromagnetic particles traveling in the fluid. This configuration provides a fluid filter with a larger filter area in a small package which is not position sensitive. Fluid entering the filter is divided into two parallel paths which have a low pressure drop. By distributing the flow and therefore trapped particles over the large filter area, a long service life is also attained.

10 Claims, 7 Drawing Figures

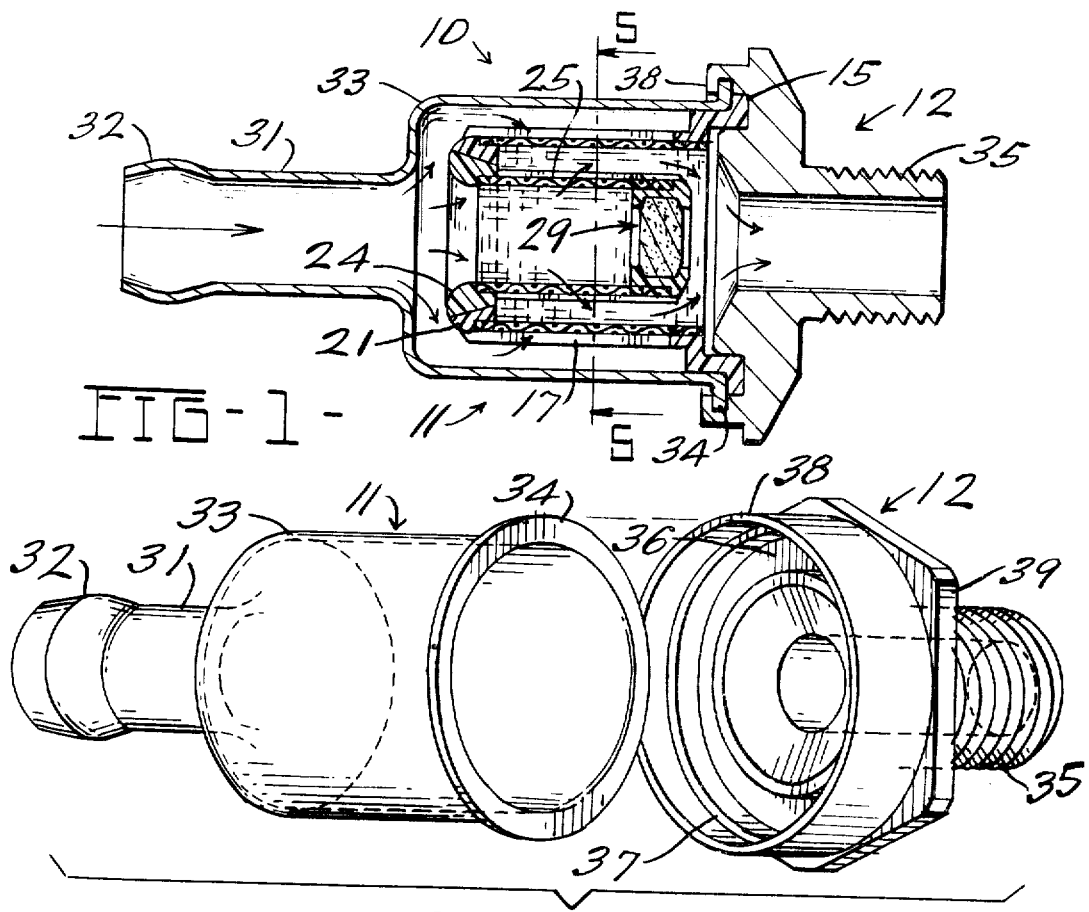
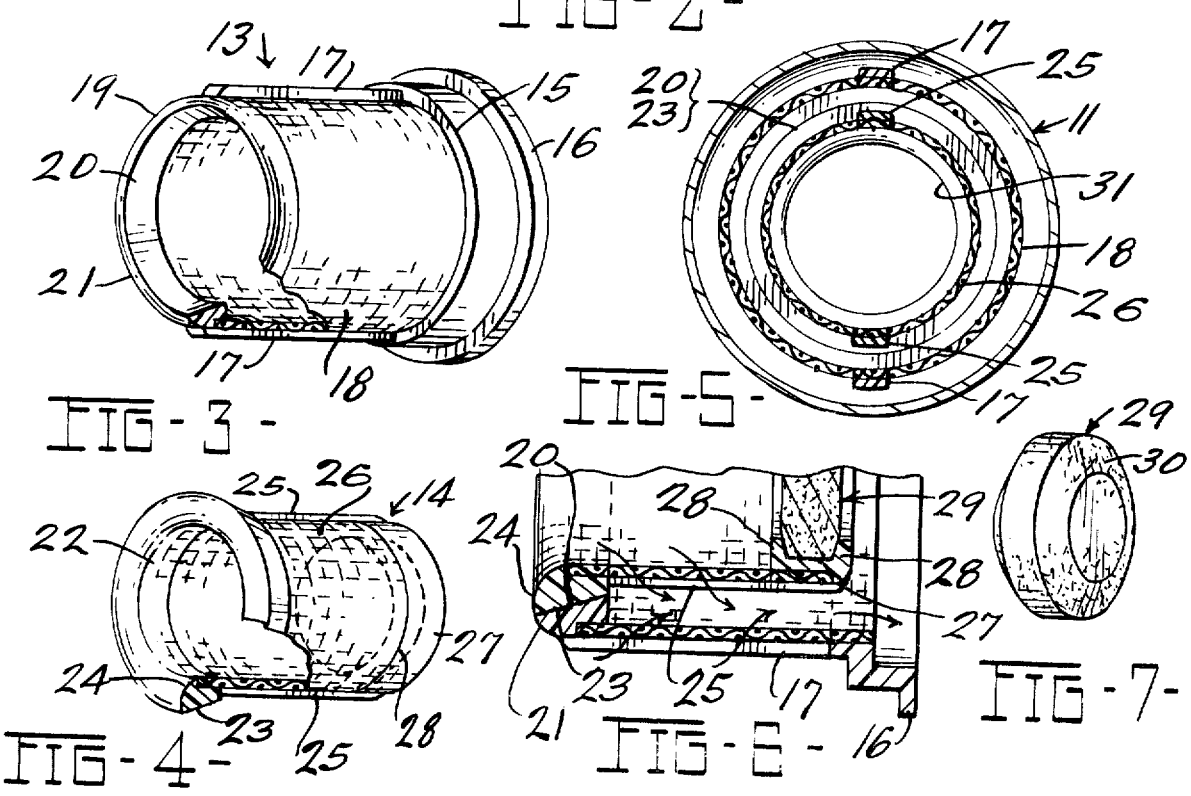

FLUID FILTER

BACKGROUND OF THE INVENTION

Filters for automotive fuel systems are generally provided with a fine mesh screen for removing foreign particles from fuel prior to its introduction into a carburetor.

Automobile carburetors are often provided with an entrance valve comprising a metallic needle and seat. Repeated opening and closing of the entrance valve effects a slight magnetization of the needle and seat. Consequently, magnetic particles often present in the fuel are attacted to the entrance valve assembly, resulting in a jamming of the valve and improper functioning of the carburetor. The present invention provides an in-line filter having a magnetic filter and two nylon mesh filters in a parallel flow relationship. The present filter tends to prevent this jamming of the carburetor entrance valve and other difficulties caused by the introduction of foreign matter into the carburetor.

The prior art discloses several compact fuel filters such as Combest, U.S. Pat. No. 3,890,232. However, because of their relatively small filtering area, their useful life is short and they tend to have substantial pressure loses at high flow rates. By creating two parallel flow paths, the instant design has both a relatively large filtering area (which produces a long service life) and a low pressure drop while retaining its small size.

Filters having magnetic elements have previously been used for filtering magnetic particles from the gasoline supplied to internal combustion engines. However, many prior art magnetic fuel filters have included a settling bowl which must be oriented in a predetermined way upon the fuel pump or carburetor. The instant invention provides an in-line magnetic filter which can be positioned anywhere in an automobile fuel line between the fuel pump and the carburetor and which can be oriented either vertically, horizontally, or obliquely.

SUMMARY OF THE INVENTION

The present invention relates to an improved in-line fluid filter.

The filter has an outer housing, preferably of cylindrical shape, with suitable inlet and outlet fittings. The fittings are connected in, for example, a fuel line of an automobile. Inside the housing are two concentric nesting, generally cylindrical filter baskets of an easily moldable material such as nylon. The filter of the outer basket provides filtering for the fuel flowing radially inward, and provides support means for mounting the inner filter basket. The inner filter basket provides filters for fuel flowing radially outward an provides support means for mounting the magnet which forms the base of the downstream end of the inner basket. The bodies of the filter baskets provide the additional function the media of predetermined mesh size which acts as the filter. The body of the outer basket also defines a gasket flange at one end of the filter or preventing fluid flow from reaching the filter outlet by any other path than through the mesh. It also provides a compressible seal between the housing and the end bell which prevents leakage from the filter. This two piece molded filter structure greater simplies the manufacture of an effective fuel line filter. Both filter elements may be made by using the known technique of insert molding a cylinder of filter media into a cylindrical cage.

In order to minimize turbulence and reduce the pressure drop through the filter, the upstream end of the inner and outer baskets is molded in a matching radiused edge which facilitates the smooth flow of the fuel around the upstream edge of the filter. The even distributions of fluid flow minimizes pressure loss and maximizes service life by encourging the even distribution of filtered particles over the filter mesh.

The inner, smaller filter assembly contains a transversely positioned magnet at its base. This magnet is strategically placed within the filter body, directly in line with the inlet flow. Because of the density of ferromagnetic particles in the fuel stream, as they enter the filter they will tend to maintain their original direction of flow and will impinge directly on the centrally positoned magnet face. Ferromagnetic particles which fail to be attracted to the first face of the magnet and which pass through the filter mesh must finally pass close to the other face of the magnet and may thus be attracted to its surface.

An object of the present invention is to provide a filter containing a relatively large filtering area with its accompanying long service life and low pressure drop while retaining the compact size of previous designs.

A further object of the present invention is to provide effective filtering means for ferromagnetic as well as non-magnetic particles.

A further object of the present invention is to provide a filtering device which is not position sensitive.

BRIEF DESCRIPTION OF THE DRAWINGS

FIG. 1 is a side sectional view showing an assembled fuel filter embodying the instant invention;

FIG. 2 is an exploded view of the housing and the outlet end bell for the fuel filter, showing the outlet end bell disassembled from the housing;

FIG. 3 is a perspective view of the outer filter basket with a section cut away;

FIG. 4 is a perspective view of the inner filter basket with a section cut away;

FIG. 5 is an end cross sectional view of the filter body taken along line 5—5 of FIG. 1;

FIG. 6 is a side sectional view of the filter basket showing the fuel flow path through the filter elements; and FIG. 7 is a side perspective view of the magnet.

DESCRIPTION OF THE PREFERRED EMBODIMENT

A fluid according to the present invention is generally indicated in FIG. 1 by the reference number 10. The filter 10 includes a tubular or cylindrical housing 11 and an outlet end bell 12, structures 11 an 12 being generally metallic. The filter 10 also includes two internally mounted filter baskets 13 and 14 which are injection molded of nylon or other suitable material. The outer filter basket 13 includes an annular support structure 15, a gasket flange 16, longitudinal support structures 15, filter mesh 18, and an annular support structure 19 which has an inwardly directed sloping surface 20, which complements and mates with the outwardly directed sloping surface 23 of inner basket 14. The inner filter basket 14 includes an annular support structure 22 which has a sloping surface 23 which mates with the corresponding surface 20 of the outer basket, a radiused surface 24 at the extremity of this support structure, longitudinal support structures 25, filter mesh 26, annular support structure 27, and inwardly directed annular ribs 28 attached to support structure 27 for tightly retaining the magnet 29.

Referring th FIGS. 1 and 2, in the present embodiment the housing 11 is of stamped metal, cylindrical in shape, and has an inlet fitting 31 also of generally cylindrical shape. The housing 11 and the fitting 31 are manufactured in one piece. At the upstream end of the inlet fitting 31 is an enlarged end portion 32, enabling the fitting to be connected to a flexible line of a fluid transmission system, such as an automobile fuel line. A shoulder portion 33 of the housing 11 is slightly rounded for increased strength. The downstream end of the casing 11 is formed into a flared rim 34 for intimate contacting with the housing's outlet end bell 12 and the gasket flange 16 of outer filter basket 13.

Referring again to FIG. 2, the outlet end bell 12 of the filter 10 is a metal structure having a threaded outlet fitting 35 for connection into a portion of a fuel transmission system, such as an automobile carburetor. The outlet end bell 12 has a recessed portion 36 adapted to fit tightly against the gasket ring 16 of the outer filter basket 13. A raised rim 37 is provided for effecting sealed contact with the flared rim 34 of casing 11. Adjacent to the raised rim 7 is an outer rim 38 which upon assembly is crimped tightly over the flared rim 34 of casing 11 as shown in FIG. 1. An outer surface 39 of the outlet end bell 12 is hexagonal so that conventional tools can be used to tighten the assembled fluid filter into a fuel transmission sytem.

Referring now to FIG. 3, the outer filter basket 13 is comprised of two annular support structures 15 and 19. Protruding from annular support structure 15 is a rim 16 which sealingly mounts the outer filter basket 13 between flange 34 of outer housing 11 and channel 36 of end bell 12 when the filter 10 is assembled. The annular support structure 15 also provides support for the integrally molded filter mesh 18. Preferably the filter mesh 18 is capture molded into annular support structure 15 of the outer filter basket assembly 13, to the two longitudinal support structures 17 and to the opposing annular support structure 19. The longitudinal support structures 17 are integrally molded to the annular support structure 15 which forms one end of the outer filter basket 13 and to the opposing annular support structure 19 which forms the opposite end, thus defining a rigid frame structure. The annular support structure 19 has an inwardly directed sloping surface 20 whose angle matches the outwardly directed sloping surface 23 of the inner filter basket 14 which allows the inner filter basket 14 to fit snugly inside the outer filter basket 13 and facilitates their permanent connection by gluing, autogenous bonding, or other means. The upstream facing edge 21 of annular support structue 19 is radiused to provide smooth flow of fluid around the upstream edge of the filter, and matches the radiused edge 24 of the inner filter basket 16 to form a smooth, continuous curve.

The inner filter basket 14 is structurally similar to the outer filter basket 13, and nests axially within it. The inner filter basket 14 consists of opposing annular support structures 22 an 27, connected by nylon longitudinal support structures 25 which form a rigid frame structure. Preferably the filter mesh 26 is capture molded to the opposing annular structures 22 and 27 and to the two longitudinal support structures 25. The larger upstream annular structural support 22 has an outwardly directed sloping surface which mates with the inwardly directed sloping surface of the outer filter basket 13 and facilitates the assembly as previously explained. The annular support structure 22 also contains an upstream facing radiused edge 24 which matches the radiused edge 21 of the outer filter basket 13 and provides a smooth bifurcation of fluid at the upstream end of the filter basket assembly in order to minimize the pressure drop through the filter. The annular support structure 27 at the opposite end of inner filter basket 14 contains inwardly directed annular ribs 28 which tightly retain the magnet 29 and prevent leakage of unfiltered around the magnet. Bevelled edges 30 of the magnetic 29 increase the surface area of the magnet and cause it to extend into the fluid flow thereby assisting the attraction of ferromagentic particles.

Referring now to FIGS. 5 and 6, the path of fluid flow through the assembled filter 10 can be readily seen. From a fuel supply, for example, from a fuel line downstream of a fuel pump, fluid enters the inlet fitting 31 of the housing 11 of the filter 10, and is laminarily divided into an inner and outer flow path around the matching radiused surfaces 21 and 24 of the upstream end of the assembled filter baskets. The flow entering the inner filter basket 14 moves generally outwardly through the filter mesh 26. Because of their relatively high density, ferromagnetic particles contained in the fuel continue traveling in a straight line and impinge upon the centrally located magnet 29. The remaining portion of the divided flow, which was directed generally radially outwardly, travels around the radiused surfaces 21 and 24 flows generally inwardly through the outer basket filter mesh 18. Ferromagnetic particles which have traveled in the latter flow path and which were not trapped in the outer filter mesh 18 will sweep past the downstream face of the magnet 29 and may be attracted to it at this time. The fluid then exits the theaded outlet fitting 35 from which it enters the fuel line or carburetor virtually devoid of foreign particles.

It will be seen that the above described preferred embodiment provides an in-line fuel filter capable of removing unwanted particles by both magnetic and filter screen separation, is rugged and vibration resistant, provides a relatively large filter area with its accompanying low pressure drop and long service life, while occupying no more space than previous filter designs, and is economical to manufacture. Various other embodiments and changes to the preferred embodiment described above will be apparent to those skilled in the art and may without departing from the spirit and scope of the following claims.

We claim:

1. A fluid filter comprising, in combination, an external housing encompassing an internal filter structure, said housing including a generally hollow shell having an open end and a closed end with a fluid inlet fitting therein and an end bell secured over said open end with a fluid outlet generally opposite said fluid inlet, said internal filter structure including a first hollow filter basket, having an outer diameter less than the inner diameter of said housing and having a peripheral flange on one end secured between the adjacent surfaces of said shell and said end bell to position it axially within said shell between said filter inlet and outlet, and first filter basket further including a circumferential wall of fluid filter media and an opposite end positioned axially toward said fluid inlet, and a second hollow filter basket positioned coaxially within said first basket, said second basket also including a circumferential wall of fluid filter media with a peripheral end flange at the inlet end of said second basket in nested engagement with said opposite end of said first basket to provide a pair of radially spaced apart circumferential filter baskets positioned within said housing between the inlet and outlet thereof, and an impervious radially extending fluid barrier extending across the peripheral outlet end of said second basket whereby fluid entering said housing is caused to flow either radially outwardly through said filter media of said second basket or radially inwardly through the filter media of said basket toward said said fluid outlet.

2. The fluid filter of claim 1 wherein said impervious fluid barrier comprises a magnet.

3. The fluid filter of claim 2, wherein said magnet comprises a phenolic material containing ferritic particles.

4. The fluid filter of claim 2, wherein said magnet comprises an integrally molded magnet of nylon and a ferritic material.

5. The fluid filter of claim 1, wherein said opposite end of said first basket and said end flange of said second basket engage one another and in connection form an annulus with a generally semi-circularly rounded cross section positioned toward said fluid inlet.

6. The fluid filter of claim 1, wherein the outwardly directed surface of said end flange of said second basket mates with the inwardly directed surface of said opposite end of said first basket to form an annulus with a continuous uninterrupted semi-circular cross section positioned toward said fluid inlet.

7. The fluid filter of claim 2, wherein said fluid filter media is capture molded into the annular ends and longitudinal support structures of said first and second baskets.

8. The fluid filter of claim 2, wherein said magnet is retained by a pair of inwardly directed annular ribs projecting from the inner surface of said outlet end of said second basket.

9. A fluid filter comprising, in combination, an external housing encompassing an internal filter structure, said housing including a generally hollow tubular shell having an open end and a closed end with a fluid inlet fitting thereon and an end bell secured over said open end with a fluid outlet generally opposite said fluid inlet, said internal filter structure including a first hollow filter basket having an outer diameter less than the inner diameter of said housing and having a peripheral flange on one end secured between the adjacent surfaces of said shell and said end bell to position it radially and axially within said shell between said inlet and said outlet, said first basket further including a circumferential wall of fluid filter media and an opposite end positioned axially toward said inlet and having a radiused edge which matches the radiused edge of a second hollow filter basket positioned coaxially within said first basket, said second basket also including a circumferential wall of fluid filter media with a peripheral end flange at the inlet end of said second basket in nested engagement with said opposite end of said first basket to provide a pair of radially spaced apart circumferential baskets positioned within said housing between said inlet and said outlet, and a magnet transversely positioned within the end of said second basket, said magnet extending across the outlet end of said second basket whereby fluid entering said housing is caused to flow either radially outwardly through said filter media of said second basket or radially inwardly through the filter media of said first basket toward said outlet.

10. The fluid filter of claim 9, wherein said fluid filter media ia capture molded into the annular ends and longitudinal support structures of said first and second baskets.

* * * * *